United States Patent
Zhu et al.

(10) Patent No.: US 7,193,721 B2
(45) Date of Patent: Mar. 20, 2007

(54) SYSTEMS USING POLARIZATION-MANIPULATING RETROREFLECTORS

(75) Inventors: Miao Zhu, San Jose, CA (US); John J. Bockman, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 178 days.

(21) Appl. No.: 10/856,204

(22) Filed: May 28, 2004

(65) Prior Publication Data

US 2005/0264823 A1    Dec. 1, 2005

(51) Int. Cl.
*G01B 9/02*    (2006.01)
(52) U.S. Cl. .................. 356/493; 356/486; 356/498
(58) Field of Classification Search ............. 356/451, 356/453, 487, 491, 497, 492, 494, 495
See application file for complete search history.

(56) References Cited

U.S. PATENT DOCUMENTS 4,693,605 A    9/1987    Sommargren
4,883,357 A *  11/1989  Zanoni et al. .............. 356/487
4,912,530 A *  3/1990   Bessho ....................... 356/487
4,930,894 A *  6/1990   Baldwin ..................... 356/485
6,198,574 B1   3/2001   Hill
6,201,609 B1   3/2001   Hill et al.
6,462,827 B1 * 10/2002  Frankel ...................... 356/491
2002/0001087 A1* 1/2002 Hill .......................... 356/510
2004/0150831 A1* 8/2004 Ray ........................... 356/493
2005/0062975 A1* 3/2005 Morris ....................... 356/451

* cited by examiner

*Primary Examiner*—Hwa (Andrew) Lee
*Assistant Examiner*—Denise B Anderson

(57) ABSTRACT

Measurement systems that separate polarization components can use retroreflectors to preserve or transform polarization and avoid unwanted mixing of the polarization components. A suitable retroreflector can include a coated cube corner reflector with retardation plates having a slow axis set at a non-zero angle away from 45° with the directions of linearly polarized component beam. The non-zero angle can be set in situ to minimize polarization mixing in a measurement system. Alternatively, a cube corner reflector with one or more polarization manipulating elements controls the polarization of a reflected beam to preserve or transform the polarization of an incident beam.

24 Claims, 5 Drawing Sheets

SYSTEMS USING POLARIZATION-MANIPULATING RETROREFLECTORS

CROSS-REFERENCE TO RELATED APPLICATIONS

This patent document is related to: co-filed U.S. patent application Entitled, "Differential Interferometer With Improved Cyclic Nonlinearity", Ser. No. 10/857,053; and co-filed U.S. patent application Entitled "Polarization-Maintaining Retroreflector Apparatus," Ser. No. 10/857,792, which are hereby incorporated by reference in their entirety.

BACKGROUND

Optical measurement systems often separate polarization components of a light beam and use the separated components for different purposes. An interferometer, for example, can separate and use one polarization component for a measurement beam that reflects from an object being measured, while the other orthogonal polarization component forms a reference beam that is compared with the measurement beam. An advantage of using polarization components is that the two component beams can be collinear and share the same common mode effects when desired and can be separated or recombined using polarizing beam splitters. However, the polarizations of the component beams in such measurement systems must generally be carefully controlled to avoid polarization changes that mix the component beams.

One result of polarization mixing in interferometers is commonly referred to as cyclic errors or cyclic nonlinearities. U.S. Pat. Nos. 4,930,894 and 4,693,605, for example, describe interferometers in which polarization change of a measurement beam or a reference beam can cause polarization leakage between the reference beam and the measurement beam, resulting in cyclic nonlinearities or measurement errors. Sources of polarization change in these interferometers include imperfect polarizing coatings in polarizing beam splitters, imperfect retardation plates that fail to change polarizations in the desired manner, and retroreflectors such as cube corner reflectors.

A retroreflector such as a solid cube corner reflector generally returns a reflected beam that is parallel to the incident beam, regardless of the angle of the incident beam. This property makes retroreflectors useful for a wide variety of optical systems. However, uncoated solid cube corner reflectors generally do not preserve the polarization state of the incident beam. A reflective coating (e.g., a silver coating) can be used on a solid cube corner reflector to mitigate or minimize the polarization change, but residual polarization changes from a coated cube corner reflector can still be a limiting factor in the precision or accuracy of measurement systems that separate polarization components.

Precision optical systems are thus desired that can employ retroreflectors but avoid unwanted mixing of polarization components.

SUMMARY

In accordance with an aspect of the invention, a cube corner reflector with one or more polarization manipulating elements controls the polarization of a reflected beam to preserve or transform the polarization of an incident beam so that the output beam has the desired polarization. Measurement systems that separate polarization components can use uncoated cube corner reflectors and still provide precision measurements with low levels of unwanted mixing of the polarization components.

In accordance with another aspect of the invention, a measurement system can employ a metal coated cube corner reflector with retardation plates that can be independently aligned to achieve a desired polarization manipulation.

BRIEF DESCRIPTION OF THE DRAWINGS

Use of the same reference symbols in different figures indicates similar or identical items.

DETAILED DESCRIPTION

In accordance with an aspect of the invention, optical measurement systems that separate polarization components can use retroreflectors that preserve or transform the polarization of an incident beam without causing unwanted depolarization. Each retroreflector in a measurement system can include a solid cube corner with one or more polarization manipulating elements such as retardation plates, optical rotators, or Faraday rotators. The polarization manipulating elements can manipulate the polarization of the incident and/or reflected beams to provide the desired polarization preservation or transformation.

Figure 1A:
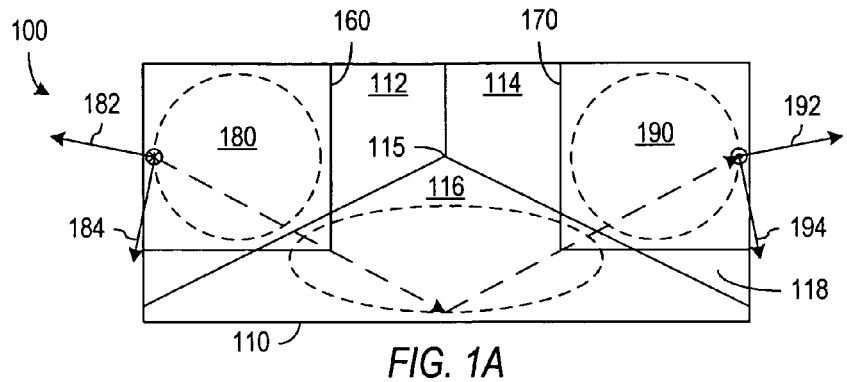
FIGS. 1A and 1B respectively show a front view and a back perspective view of a solid cube corner reflector in accordance with an embodiment of the invention.
Figure 1B:
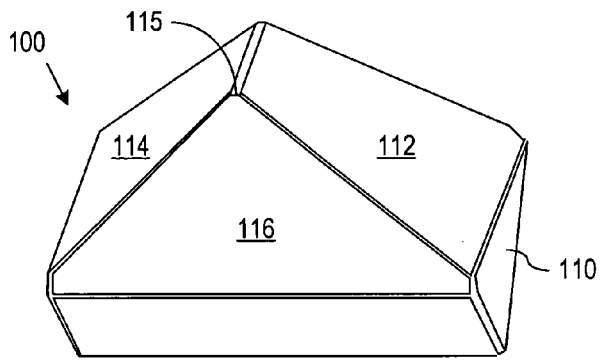

FIGS. 1A and 1B respectively show a front view and a back view of a trimmed cube corner reflector 100. Cube corner reflector 100 includes a solid block 110 of glass or other optical quality material with three planar reflecting surfaces 112, 114, and 116 and a front face 118. Surfaces 112, 114, and 116 intersect at right angles in the same manner as the intersection of faces at the corner of a cube, and front face 118 is preferably perpendicular to a symmetry axis through an apex 115 of the cube corner. Block 110 as illustrated is trimmed to remove excess glass and make face 118 rectangular. Alternatively, block 110 can be untrimmed (i.e., a tetrahedral glass block with a triangular faces 112, 114, 116, and 118) or trimmed to provide face 118 with any other desired shape (e.g., circular).

Polarization manipulating elements 160 and 170 are respectively in the paths of an incident beam 180 and a reflected beam 190 that pass through front face 118 of block 110. Cube corner reflector 100 is a retroreflector, and therefore reflected beam 190 from cube corner reflector 100 is parallel to but offset from incident beam 180 regardless of the direction of incident beam 180.

In traversing block 110, incident beam 180 reflects from surface 112 and then from surface 116 before a final reflection from surface 114 directs reflected beam 190 out through face 118. In alternative embodiments of the invention, block 110 can either be coated (e.g., with a reflective coating such as silver) on reflection surfaces 112, 114, and 116 or can be uncoated (e.g., surface where total internal reflection occurs). The specific types of optical elements used for polarization manipulating elements 160 and 170 will generally depend on whether block 110 is coated or uncoated.

The reflection process in block 110 in an embodiment where block 110 is coated approximately preserves circular polarizations, and each polarization-manipulating element 160 and 170 can be a quarter-wave retardation plate for this embodiment. A quarter-wave plate having a slow axis at 45° to the polarization directions of the linear polarizations of the components used in a measurement system generally converts the orthogonal linearly-polarized components into orthogonal circularly-polarized components. In particular, element 160 can change a linearly polarized incident beam 180 into a circularly polarized beam for entry into block 110, but reflected beam 190 will then have a slightly elliptical polarization since reflections in a coated cube corner reflector only approximately preserve circular polarizations. Element 190, if at 45° to the polarization directions of the linear polarization components, converts a circularly polarized beam into a linearly polarized beam but converts the elliptical polarization to a mixture of the two orthogonal linear polarizations.

In accordance with an aspect of the invention, quarter-wave plates used with a coated cube corner reflector have adjustable orientations. In this particular embodiment, elements 160 and 170 can be quarter-wave plates with the crystal axis that are adjusted away from 45° to minimize polarization mixing and the resulting cyclic errors in the measurement system. A co-filed U.S. patent application Ser. No. 10/857,053 entitled, "Differential Interferometer With Improved Cyclic Nonlinearity", further describes structures and methods for using adjustable retardation plates with retroreflectors to minimize polarization mixing and cyclic errors.

The reflection process in an embodiment where block 110 is uncoated or coated with non-lossy coatings, e.g., a thin dielectric coating, transforms specific orthogonal linear polarizations 182 and 184 of incident beam 180 respectively into orthogonal linear polarizations 192 and 194 of reflected beam 190. In particular, block 110 when uncoated or coated with a non-lossy coating produces a linearly polarized reflected beam if polarization 182 is at a specific angle that is selected according to the properties of the cube corner material. For an uncoated cube corner made of BK-7, this angle is about 13.7° from a plane bisecting the wedge formed by surfaces 112 and 114. In which case, the output linear polarizations 192 and 194 respectively corresponding to input linear polarizations 182 and 184 are orthogonal but rotated by about 13.7° in the opposite direction. In accordance with an aspect of the invention, polarization-manipulating elements 160 and 170 can rotate polarizations 182 and 184 or 192 and 194 so that cube corner reflector 100 preserves the polarization components of the input beam. Alternatively, polarization-manipulating elements 160 and 170 can produce a controlled transformation of the linear polarization so that the output polarization differs from input polarization in a known manner (e.g., is rotated by an angle that is an integer multiple of 90°).

In one embodiment of the invention where block 110 is uncoated or has a non-lossy coating, each polarization manipulating element 160 or 170 is a half-wave retardation plate that is in a mounting that permits adjustment of the orientation of the slow axis of the element 160 or 170. In this embodiment, input half-wave plate 160 is adjusted in situ to rotate the linear polarization components to the directions for which block 110 produces a linearly polarized reflected beam. Output half-wave plate 170 is similarly adjusted in situ to rotate the resultant linearly polarized output beam as required for use in the measurement system. The above-identified U.S. patent application Ser. No. 10/857,053 provides further description of structures and methods for minimizing cyclic error using an uncoated cube corner with adjustable retardation plates.

In another embodiment of the invention where block 110 is uncoated, each polarization manipulating element 160 or 170 is an optical rotator or a Faraday rotator that rotates the polarization directions by the required amounts to minimize cyclic errors or nonlinearities in a measurement system. Optical rotators or Faraday rotators have the advantage of providing the desired amount of rotation without requiring a time-consuming alignment process. Additionally, an optical rotator based on quartz is typically thicker (e.g., about 1 mm) than a wave plate (e.g., about 0.02 mm) and therefore is easier to handle. A co-filed U.S. patent application Ser. No. 10/857,792 entitled "Polarization-Maintaining Retroreflector Apparatus," further describes systems and methods for using optical rotators or Faraday rotators to minimize polarization mixing in measurement systems.

Figure 2A:
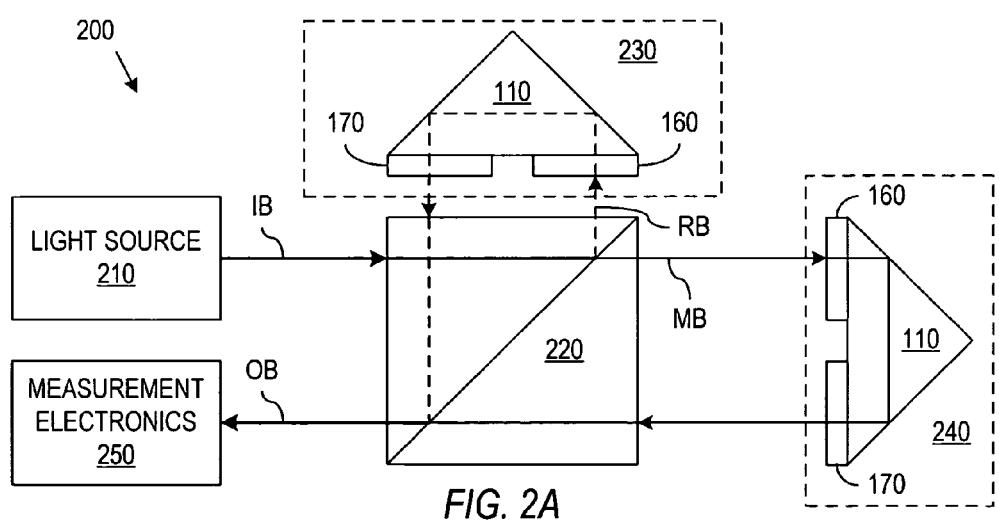
FIG. 2A shows a linear interferometer in accordance with an embodiment of the invention using polarization-preserving retroreflectors.

FIG. 2A illustrates an interferometer 200 in accordance with an embodiment of the invention. Interferometer 200 includes a light source 210, a polarizing beam splitter (PBS) 220, a reference reflector 230, a measurement reflector 240, and measurement electronics 250. Interferometer 200 can be similar to commercially available interferometers such as a 10702A linear interferometer available from Agilent Technologies, Inc., but interferometer 200 employs polarization-preserving retroreflectors for reference reflector 230 and measurement reflector 240.

Light source 210 is generally a laser or other source of an input light beam IB having the required properties of interferometer 200. For example, light source 210 can be a HeNe laser or some other source of a coherent monochromatic beam having the desired wavelength, intensity, and polarization for input beam IB. For a heterodyne interferometer, light source 210 can be a Zeeman split laser or some other source that provides input beam IB with two orthogonal polarization components having slightly different wavelengths.

PBS 220 splits an incident beam from light source 210 according to linear polarization. PBS 220 directs a reference beam RB having a first linear polarization toward reference reflector 230 and directs a measurement beam MB having a second linear polarization toward measurement reflector 240. FIG. 2A illustrates an example where the component reflected in PBS 220 forms reference beam RB, but either the reflected beam or the transmitted beam could be used equally well for the reference beam (or the measurement beam). Ideally, the linear polarization of reference beam RB is orthogonal to the linear polarization of measurement beam MB.

Reference reflector 230 and measurement reflector 240 are preferably identical polarization-preserving retroreflectors such as described above with reference to FIGS. 1A and 1B. An advantage of using retroreflectors is reduction of alignment errors associated with the relative orientations of reflectors 230 and 240. Also, reference reflector 230, being a retroreflector, returns the reference beam RB to PBS 220 along a path that is parallel to but offset from the incident path of the reference beam RB from PBS 220. The measurement beam MB similarly returns to PBS 220 from measurement reflector 240 along a path that has the same offset from the outgoing path from PBS 220. As a result, the returning reference and measurement beams are incident at the same point on the polarizing coating in PBS 220, so that PBS 220 recombines the measurement and reference beams into an output beam OB.

Measurement electronics 250 receives output beam OB and can analyze or compare the recombined measurement and reference beams to measure the movement of measurement reflector 240 (or reference reflector 230). One type of analysis for a homodyne interferometer measures changes in the phase difference between the measurement beam and the reference beam, e.g., using interference of the measurement and reference beams. Alternatively, a measurement of the Doppler shift in the measurement beam indicates the velocity of the measurement reflector. The Doppler shift can be measured in a heterodyne interferometer as a change in a beat frequency resulting from combination of the measurement and reference beams. Leakage of a portion of the reference beam RB into the measurement beam MB before reflection from measurement reflector 240 or leakage of a portion of the measurement beam MB into the reference beam RB will generally introduce frequency components that make the desired beat signal more difficult to measure. Polarization-preserving retroreflectors 230 and 240 help avoid leakage between the measurement and reference beams and therefore can improve the ability of interferometer 200 to accurately measure movement of measurement reflector 240.

Figure 2B:
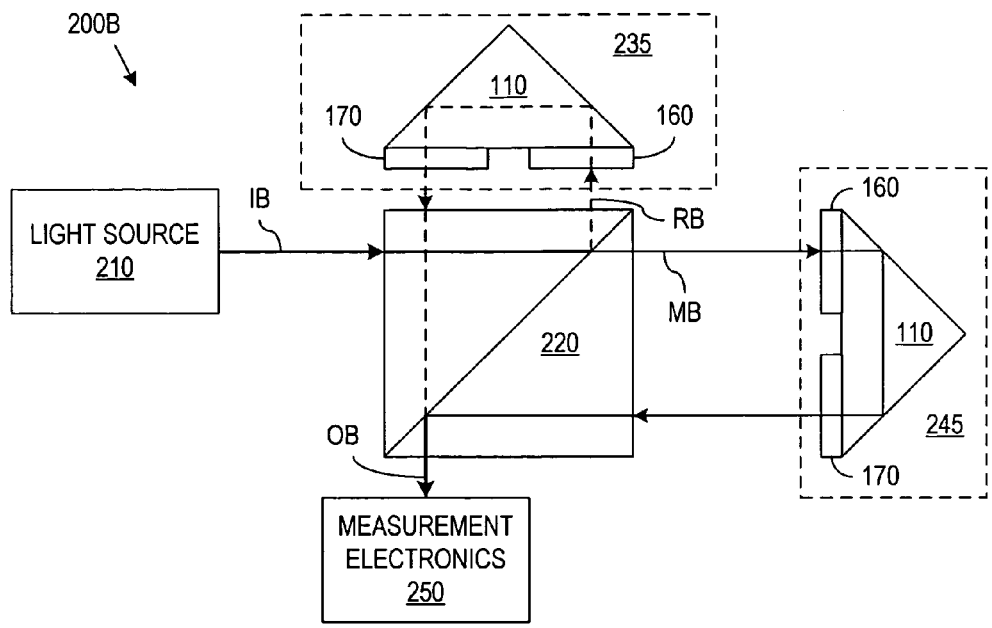
FIG. 2B shows a linear interferometer in accordance with an embodiment of the invention using polarization-transforming retroreflectors.

Polarization-transforming retroreflectors can also help avoid leakage between the measurement beam MB and the reference beam RB in interferometers. FIG. 2B shows an interferometer 200B that is the same as interferometer 200 of FIG. 2A except that interferometer 200B uses polarization-transforming retroreflectors 235 and 245 in place of the polarization-preserving retroreflectors 230 and 240 used in interferometer 200. The paths of the measurement beam MB and the reference beam RB in interferometer 200B are the same as described above for interferometer 200 except that polarization-transforming retroreflectors 235 and 245 rotate the respective polarizations of the reference beam RB and the measurement beam MB by 90°. As a result, the reference beam RB, which initially reflects from the polarizing coating in PBS 220, passes through the polarizing coating after reflections from polarization-transforming retroreflector 235, and the measurement beam MB, which initially passes through the polarizing coating in PBS 220, reflects from the polarizing coating after reflections from polarization-transforming retroreflector 245. This change moves output beam OB to a different side of PBS 220.

Interferometer 200B, when compared to interferometer 200, provides more space for the structures associated with directing the input beam IB into PBS 220 and directing the output beam OB to the measurement electronics 250. Accordingly, optical components such as PBS 220 and retroreflectors 235 and 245 can be made smaller and still allow sufficient room for beam input and output systems. Additionally, in interferometer 200B, the polarizing coating in PBS 220 reflects each of the reference beam RB and the measurement beam MB once and transmits each beam once, thereby providing equal extinction ratios for both beams. The polarization control of polarization-transforming retroreflectors 235 and 245 still reduces cyclic errors in measurements, when compared to systems using conventional retroreflectors.

Figure 3:
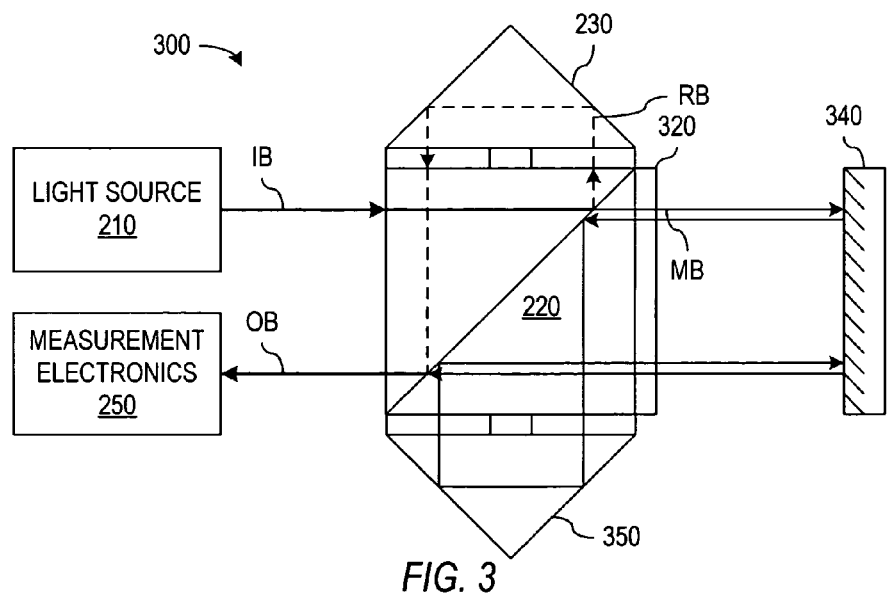
FIG. 3 shows a thermally unbalanced plane mirror interferometer in accordance with an embodiment of the invention using one or more polarization-preserving retroreflectors.

FIG. 3 illustrates a plane mirror interferometer 300 in accordance with an embodiment of the invention. Interferometer 300 can be generally similar to a commercial plane mirror interferometer such as the 10706A Plane Mirror Interferometer from Agilent Technologies, Inc., but interferometer 300 includes polarization-preserving retroreflectors 230 and 350 in accordance with an embodiment of the invention.

Plane mirror interferometer 300 differs from interferometer 200 of FIG. 2A in that measurement reflector 340 is a planar mirror. The measurement beam MB from PBS 220 in interferometer 300 is ideally normal to the surface of planar reflector 340 so that the reflected measurement beam returns from planar reflector 340 on the same path as the incident measurement beam. (FIG. 3 shows incident and reflected beams with separations to better illustrate the beam paths in interferometer 300, but ideally the incident and reflected beams from planar reflector 340 are co-linear.)

A quarter-wave plate 320 and a polarization-preserving retroreflector 350 are added to the path of the measurement beam MB to provide an offset that aligns the measurement beam MB for recombining with the reference beam RB and to provide a second reflection of the measurement beam MB from measurement reflector 340. A pair of passes of measurement beam MB through quarter-wave plate 320, one before and one after the first reflection from measurement reflector 340, effectively rotates the linear polarization of the measurement beam MB by 90°, so that PBS 220 reflects the returning measurement beam MB towards polarization-preserving retroreflector 350.

Retroreflector 350 returns the measurement beam MB to PBS 220 after providing an offset matching the offset that reference reflector 230 provides to the reference beam RB. From retroreflector 350, the measurement beam MB reflects from the polarizing coating in PBS 220, passes through quarter-wave plate 320, reflects from measurement reflector 340, and returns through quarter-wave plate 320. The second reflection from measurement reflector 340 effectively doubles the Doppler shift of the measurement beam MB that results when measurement reflector 340 moves, and the final pair of passes through quarter-wave plate 320 effectively rotates the linear polarization of the measurement beam MB by another 90°. The measurement beam MB then passes through PBS 220 and recombines with the reference beam RB to form output beam OB. Measurement electronics 250 can analyze the output beam OB using the techniques described above.

A disadvantage of plane mirror interferometer 300 is that the optical path of the measurement beam MB in glass elements such as PBS 220 is longer than the optical path of the reference beam RB in glass. As a result, the effect of thermal expansion of PBS 220 and other elements on the measurement beam MB differs from the effect of thermal expansion of PBS 220 on the reference beam RB. Thermal changes can thus affect the measurements in plane mirror interferometer 300, and therefore plane mirror interferometer 300 is commonly referred to as being thermally unbalanced. However, the use of polarization-preserving retroreflectors 230 and 350 reduces cyclic nonlinearities that could otherwise result from mixing of the measurement and reference beams.

Figure 4:
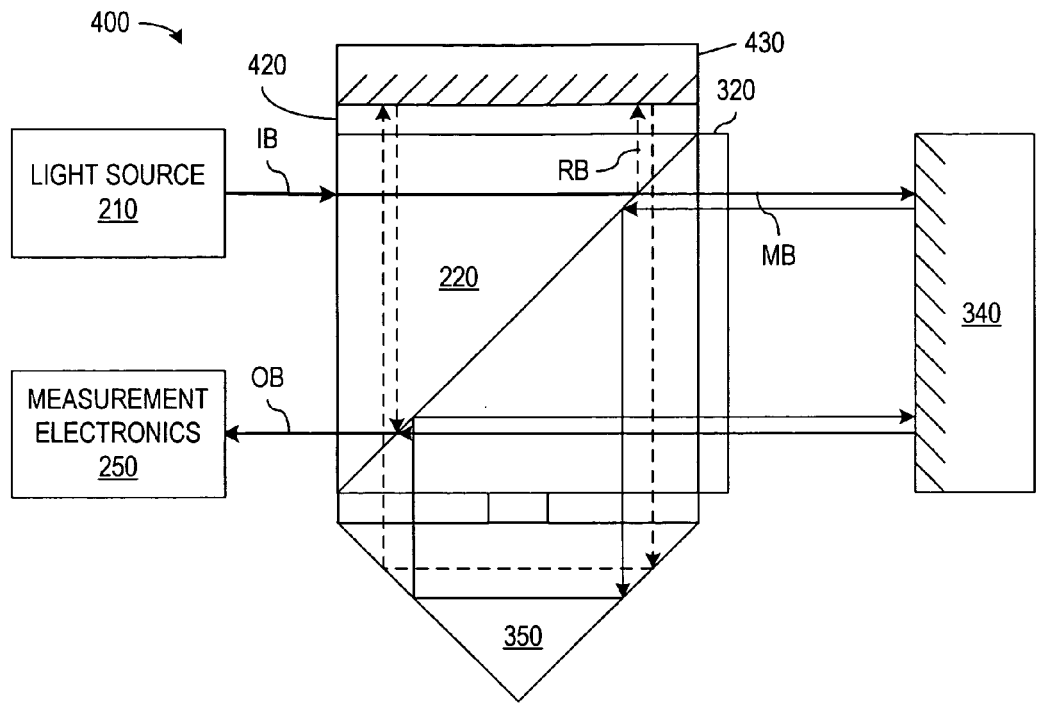
FIG. 4 shows another plane mirror interferometer in accordance with an embodiment of the invention using a polarization-preserving retroreflector.

FIG. 4 shows a thermally balanced plane mirror interferometer 400 in accordance with an embodiment of the invention. Interferometer 400 can be generally similar to a commercial plane mirror interferometer such as the 10706B Hi Stability Plane Mirror Interferometer from Agilent Technologies, Inc., but interferometer 400 includes a polarization-preserving retroreflector 350 in accordance with an embodiment of the invention.

Interferometer 400 differs from interferometer 300 of FIG. 3 in that reference retroreflector 230 of interferometer 300 is replaced with the combination of a quarter-wave plate 420 and a planar reflector 430. The replacement changes the reference path to provide the reference beam RB with an optical path length through glass that matches the optical path length of the measurement beam MB through glass. In particular, the reference beam RB, which in FIG. 4 is the portion of the input beam IB that initially reflects from the polarizing coating in PBS 220, passes through quarter-wave plate 420, reflects at normal incidence from planar reference reflector 430, and returns along the same path through quarter-wave plate 420. The two passes through quarter-wave plate 420 rotate the linear polarization of the reference beam RB by 90° so that the reference beam RB then passes through PBS 220 and enters polarization-preserving retroreflector 350 along the same path that the measurement beam MB enters retroreflector 350. Retroreflector 350 returns an offset reference beam RB that passes through PBS 220 and quarter-wave plate 420, reflects a second time from reference reflector 430, and returns to PBS 220 through quarter-wave plate 420. The second pair of passes through quarter-wave plate 420 rotates the linear polarization of the reference beam RB by 90° so that the reference beam RB then reflects from the polarizing coating in PBS 220 and recombines with the measurement beam MB that passes through the polarizing coating in PBS 220.

Interferometer 400 matches the optical path lengths in glass of the reference and measurement beams to reduce the adverse effects that temperature changes could otherwise have on measurement accuracy. However, the measurement and reference beams traverse substantially the same path through retroreflector 350, eliminating the ability of PBS 220 to filter out polarization mixing that may occur in retroreflector 350. Accordingly, the use of a polarization-preserving retroreflector that minimizes polarization mixing can provide a significant reduction in cyclic non-linearities in the measurements.

Figure 5:
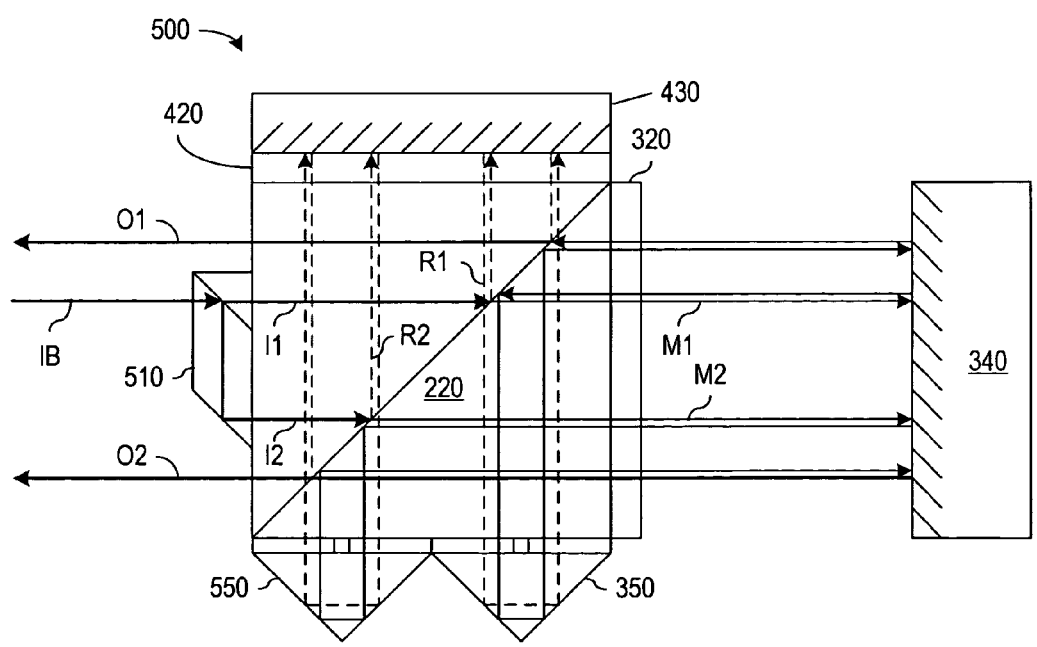
FIG. 5 shows a multi-axis plane mirror interferometer using polarization-preserving retroreflectors in accordance with an embodiment of the invention.

FIG. 5 shows a multi-axis plane mirror interferometer 500. Multi-axis plane mirror interferometer 500 is similar to plane mirror interferometer 400 of FIG. 4 but has two separate input beam beams I1 and I2 that correspond to different measurement axes. In the illustrated embodiment, a non-polarizing beam splitting element 510 splits an input beam IB (e.g., from a light source 210 as described above) into two separate beams I1 and I2 that are input to PBS 220. PBS 220 separates linear polarization components of the input beams I1 and I2 to form two measurement beams M1 and M2 and two reference beams R1 and R2. Measurement beam M1 and reference beam R1 follow the optical paths described above, which include a shared path through polarization-preserving retroreflector 350, and recombine to form an output beam O1. Measurement beam M2 and reference beam R2 follow paths that pass through a second polarization-preserving retroreflector 550 before being recombined in a second output beam O2.

The offsets provided by element 510 and retroreflectors 350 and 550 control a separation between output beams O1 and O2. Output beams O1 and O2 can thus be separately analyzed to measure movement along the measurement axes corresponding to the reflection points on measurement reflector 340. In a similar manner, beams for three or more measurement axes can be routed through a shared PBS 220. The use of polarization-preserving retroreflectors for each axis reduces polarization mixing and thereby reduces cyclic nonlinearities in the measurements.

Figure 6:
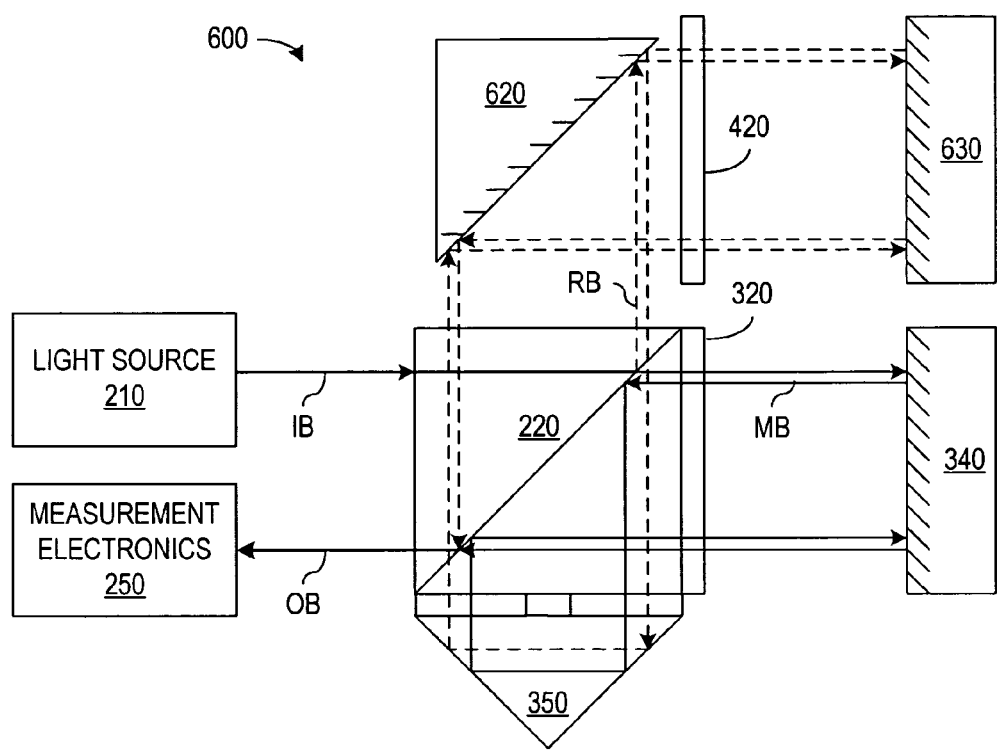
FIG. 6 shows a single-axis differential interferometer in accordance with an embodiment of the invention using a polarization-preserving retroreflector.

FIG. 6 shows a differential plane mirror interferometer 600 in accordance with an embodiment of the invention. Interferometer 600 can be generally similar to a commercial differential plane mirror interferometer such as the 10719A One-Axis Differential Interferometer from Agilent Technologies, Inc., but interferometer 600 includes a polarization-preserving retroreflector 350 in accordance with an embodiment of the invention.

Interferometer 600 is substantially the same as plane mirror interferometer 400 of FIG. 4 except that fixed reference reflector 430 is replaced with a moveable reflector 630 and an optional turning mirror 620 is between PBS 220 and quarter-wave plate 420. The optical paths in interferometer 600 are the same as those described in regard to interferometer 400 above except that the reference beam RB travels out to and reflects from movable reflector 630 instead of having a fixed path. The combined output beam OB from interferometer 600 thus includes a measurement beam component having a phase and a Doppler shift that depends on the position and the velocity of measurement reflector 340 and a reference beam component having a phase and a Doppler shift that depends on the position and the velocity of reference reflector 630. Measurement electronics can thus compare the measurement and reference beam components to determine a difference between the position or movement of reflectors 340 and 630.

Figure 7:
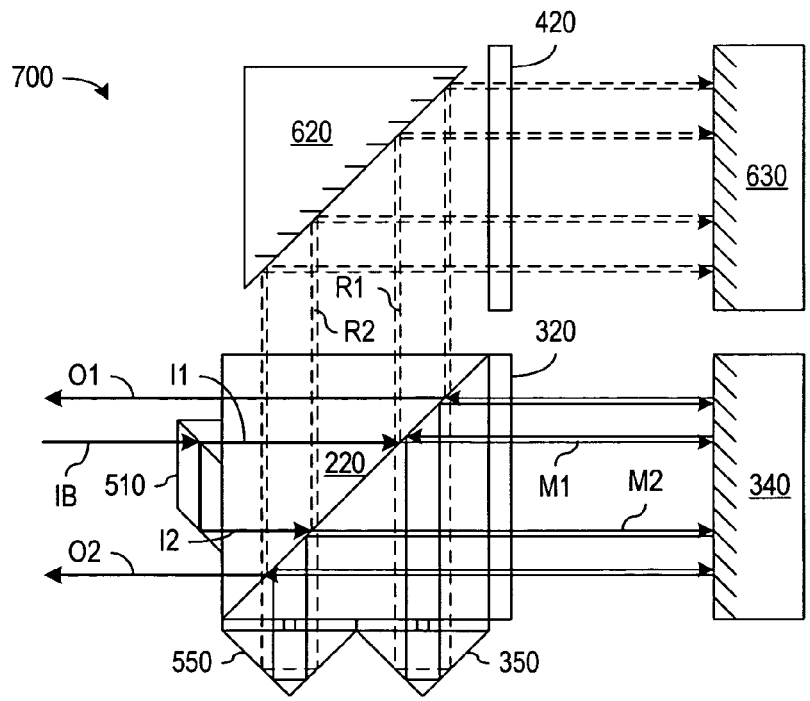
FIG. 7 shows a multi-axis differential interferometer in accordance with an embodiment of the invention using polarization-preserving retroreflectors.

FIG. 7 shows a multi-axis differential plane mirror interferometer 700 in accordance with an embodiment of the invention. Interferometer 700 can be generally similar to a commercial differential plane mirror interferometer such as the 10721A Two-Axis Differential Interferometer from Agilent Technologies, Inc., but interferometer 600 includes polarization-preserving retroreflectors 350 and 550 in accordance with an embodiment of the invention.

Interferometer 700 is substantially the same as multi-axis plane mirror interferometer 500 of FIG. 5 except for the replacement of fixed reference reflector 430 with moveable reflector 630 and the addition of the optional turning mirror 620 between PBS 220 and quarter-wave plate 420. Interferometer 700 like interferometer 500 has a first measurement axis corresponding to reflections from measurement reflector 340, but the two measurements are referenced to corresponding reflections from moveable reference reflector 630.

Figure 8:
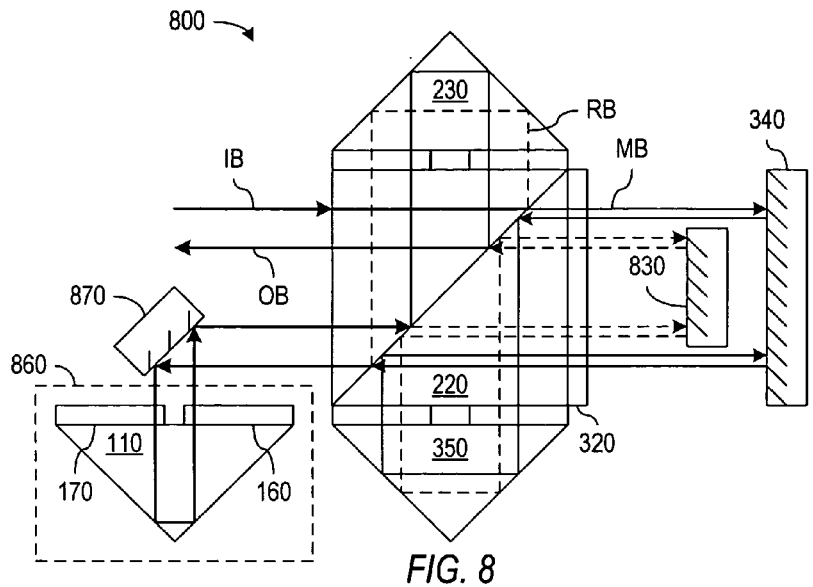
FIG. 8 shows a single-axis differential interferometer in accordance with an embodiment of the invention using polarization-preserving and polarization-transforming retroreflectors.

FIG. 8 shows a differential plane mirror interferometer 800 in accordance with yet another embodiment of the invention. Interferometer 800 can be generally similar to a commercial differential plane mirror interferometer such as the 10715A Differential Interferometer from Agilent Technologies, Inc., but interferometer 800 includes polarization-preserving retroreflectors 230 and 350 and a polarization-transforming retroreflector 860 in accordance with an embodiment of the invention.

PBS 220 splits the input beam IB of interferometer 800 according to polarization into a measurement beam MB and a reference beam RB. The optical path of measurement beam MB, which initially passes through the polarizing coating in PBS 220, passes through quarter-wave plate 320, reflects from measurement reflector 340 and returns to PBS 220 through quarter-wave plate 320. Passing through quarter-wave plate 320 twice rotates the linear polarization of the measurement beam MB by 90° so that measurement beam MB then reflects from the polarizing coating in PBS 220 and enters polarization-preserving retroreflector 350, which reflects and offsets the measurement beam MB. The measurement beam MB then passes through quarter-wave plate 320, reflects a second time from measurement reflector 340 and returns to PBS 220 through quarter-wave plate 320. The second pair of passes through quarter-wave plate 320 rotates the linear polarization of measurement beam MB by 90° so that measurement beam MB passes through PBS 220 and enters a polarization transforming retroreflector 860 via reflection from an optional turning mirror 870.

In a preferred embodiment, polarization-transforming retroreflector 860 includes an uncoated cube corner block 110 and polarization-manipulating elements 160 and 170 that effectively rotate the linear polarization of the measurement beam MB (or of reference beam RB) by 90°. This can be achieved if element 160 is a Faraday rotator that rotates the linear polarization components (e.g., by about 13.7°) to the directions for which reflection in block 110 preserves the linear polarizations. Element 170 is then a Faraday rotator that rotates the output linear polarizations by the amount (e.g., about 76.3°) required to achieve a net 90° rotation of the linear polarizations.

After the polarization rotation in retroreflector 860, the measurement beam MB enters PBS 220 and reflects from the polarizing coating into polarization preserving retroreflector 230. Polarization preserving retroreflector 230 reflects the measurement beam MB back to PBS 220, where the measurement beam reflects from the polarization coating and recombines with the reference beam RB.

The path of reference beam RB, which initially reflects from the polarizing coating in PBS 220, enters polarization-preserving retroreflector 230, reflects back to PBS 220, and reflects from the polarizing coating in PBS 220 into polarization-transforming retroreflector 860. Upon returning from retroreflector 860, the reference beam passes through PBS 220 and quarter-wave plate 320, reflects from planar reference reflector 830, and returns to PBS 220 through quarter-wave plate 320. Measurement beam RB then reflects from the polarizing coating into polarization-preserving retroreflector 350, returns to PBS 220 from retroreflector 350, reflects from the polarizing coating, passes through quarter-wave plate 320, reflects from reference reflector 830 and returns through quarter-wave plate 320 to PBS 220. Reference beam RB then passes through the polarizing coating of PBS 220 and recombines with measurement beam MB to form output beam OB.

Interferometer 800 as described above has three retroreflectors 230, 350, and 860 through which both component beams (i.e., the measurement beam MB and the reference beam RB) pass. Accordingly, measurements derived from output beam OB can achieve greater accuracy since each of the retroreflectors 230, 350, and 860 in accordance with the present invention minimizes mixing of the measurement and reference beam polarizations.

Figure 9:
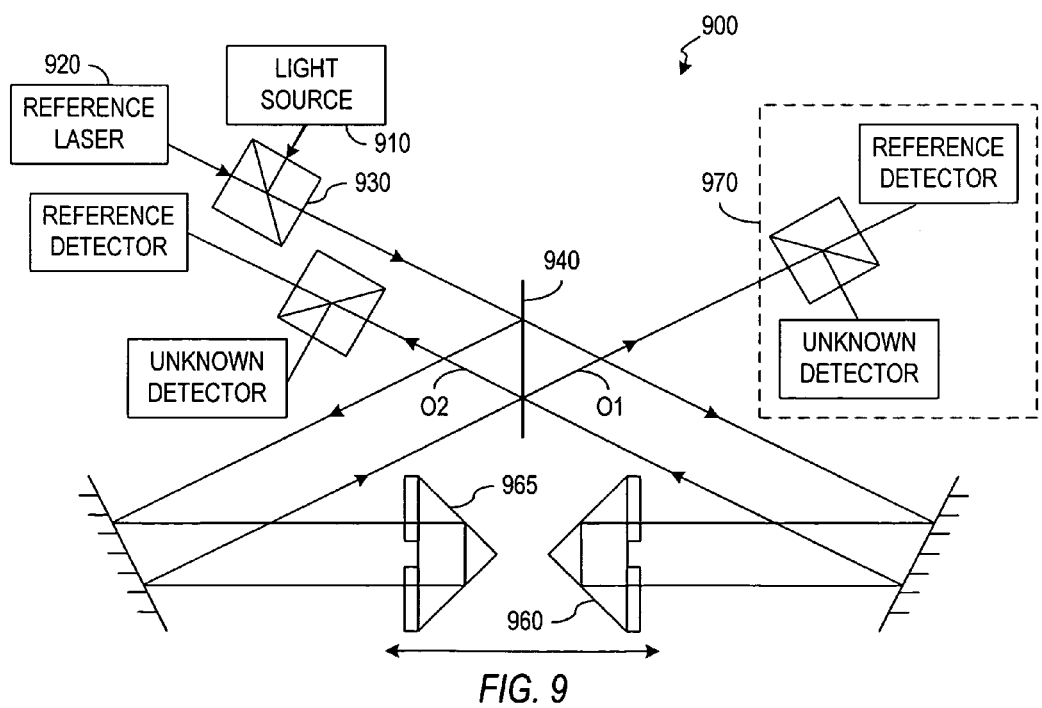
FIG. 9 shows a system in accordance with an embodiment of the invention using polarization-preserving retroreflectors when measuring the wavelength or spectral content of a light source.

Application of polarization-controlled retroreflectors is not limited to use in interferometers. FIG. 9 illustrates a measurement system 900 in accordance with an embodiment of the invention that is capable of measuring the wavelength or spectral content of a light source 910. System 900 include a reference laser 920, a polarizing beam splitter 930, a non-polarizing beam splitter 940, polarization preserving retroreflectors 960 and 965, and a detector system 970.

In operation, light source 910 produces a beam having an unknown wavelength or spectral content, and reference laser 920 produces a beam having a known wavelength. Polarizing beam splitter 930 is positioned to combine the portion of the beam from light source 910 having the linear polarization reflected in PBS 930 with the portion of the beam from laser 920 having the linear polarization transmitted through PBS 930. The combined beam is incident on non-polarizing beam splitter 940, which directs a first portion (e.g., half) of the combined beam to polarization preserving retroreflector 960 and a second portion of the combined beam to polarization preserving retroreflector 965. The beams returned from retroreflectors 960 and 965 are also incident of non-polarizing beam splitter 940 and interfere with each other when combined into output beams O1.

Detector system 970 separately measures the intensities of the polarization components of output beam O1. If measurement system 900 has preserved polarizations, one polarization component of output beam O1 has the known wavelength produced in reference laser 920. Retroreflector 960 and/or retroreflector 965 can be moved to change the difference in the optical path lengths of the two arms of system 900. The movement of the retroreflectors 960 and/or 965 causes the intensity of the polarization component to rise and fall as the path length difference alternates between causing constructive or destructive interference of the component having the known wavelength. If light source 910 produces a monochromatic beam, the intensity of the polarization component corresponding to light source 910 will similarly rise and fall as difference between the path lengths change, and the ratio of the number of maxima detected for the unknown wavelength to the number of maxima detected for the known wavelength identifies the unknown wavelength. If light source 910 does not produce a monochromatic beam, the intensity measurement of the polarization component corresponding to light source 910 will be a superposition of interference patterns, and analysis of the measured intensity, for example, using Fourier analysis or other techniques, can determine the spectral content of the beam from light source 910.

Output beam O2 can be similarly analyzed to confirm or improve the measurements resulting from analysis of output beam O1.

The accuracy of measurements performed in system 900 generally depends on the ability to distinguish and separate polarization components that correspond to different light sources 910 and 920. In accordance with an aspect of the invention, the polarization preserving retroreflectors 960 and 965 reduce or avoid mixing of the polarization components and therefore permit more accurate measurements.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A system comprising:
a source of a first input beam containing a first polarization component and a second polarization component;
a polarizing beam splitter positioned to separate the first polarization component from the second polarization component; and
a first polarization-manipulating retroreflector positioned to reflect the first polarization component before the first polarization component and the second polarization component are recombined, wherein the first polarization-manipulating retroreflector comprises:
a cube corner block;
a first polarization-manipulating element in a path of an incident beam entering the cube corner block, the first polarization-manipulating element rotating polarizations of the first and second polarization components to directions for which the cube corner block produces linear polarizations in a reflected beam from the cube corner block; and
a second polarization-manipulating element in a path of the reflected beam, wherein the second polarization-manipulating element converts the linear polarizations of the reflected beam to a desired form.

2. The system of claim 1, further comprising a second polarization-manipulating retroreflector positioned to reflect the second polarization component before the first polarization component and the second polarization component are recombined.

3. The system of claim 2, further comprising:
a first planar reflector; and
a quarter-wave plate between the first planar reflector and the polarizing beam splitter, wherein the second polarization component from the polarizing beam splitter reflects from the first planar reflector once before reflecting from the second polarization-manipulating retroreflector and once after reflecting from the second polarization-manipulating retroreflector.

4. The system of claim 3, further comprising:
a second planar reflector in a path of the first polarization component, wherein the quarter-wave plate is between the polarizing beam splitter and the second planar reflector; and
a polarization-transforming retroreflector that is in the path of the first polarization component and in a path of the second polarization component.

5. The system of claim 1, further comprising:
a first planar reflector;
a first quarter-wave plate between the first planar reflector and the polarizing beam splitter, wherein the first quarter-wave plate and the first planar reflector are in a path of the first polarization component;
a second planar reflector; and
a second quarter-wave plate between the second planar reflector and the polarizing beam splitter, wherein the second quarter-wave plate and the second planar reflector are in a path of the second polarization component.

6. The system of claim 5, wherein the first planar reflector comprises a reference reflector and has a fixed position relative to the polarizing beam splitter.

7. The system of claim 5, wherein the system comprises a differential interferometer, and the first planar reflector and the second planar reflector are remote from the polarizing beam splitter.

8. The system of claim 5, further comprising:
a source of a second input beam containing a third polarization component and a fourth polarization component, wherein the third and fourth polarization components respectively have polarizations that are the same as polarizations of the first and second polarization components; and
a second polarization-manipulating retroreflector positioned to reflect the third polarization component before the third polarization component and the fourth polarization component are recombined.

9. The system of claim 8, wherein the system is a multi-axis interferometer having a first measurement axis corresponding to the first input beam and a second measurement axis corresponding to the second input beam.

10. The system of claim 9, wherein the first planar reflector comprises a reference reflector and has a fixed position relative to the polarizing beam splitter.

11. The system of claim 8, wherein the multi-axis interferometer is a differential interferometer, and the first planar reflector and the second planar reflector are remote from the polarizing beam splitter.

12. The system of claim 1, wherein the system comprises an interferometer.

13. The system of claim 1, wherein reflections in the cube corner block result from total internal reflection.

14. The system of claim 1, wherein each of the first and second polarization-manipulating elements is selected from a group of elements consisting of a half-wave plate, an optical rotator, and a Faraday rotator.

15. A system comprising:
a source of a first input beam containing a first polarization component and a second polarization component;
a polarizing beam splitter positioned to separate the first polarization component from the second polarization component; and
a first polarization-manipulating retroreflector positioned to reflect the first polarization component before the first polarization component and the second polarization component are recombined, wherein the first polarization-manipulating retroreflector comprises:
a cube corner block that has a reflective coating;
a first retardation plate in a path of an incident beam entering the cube corner block; and
a second retardation plate in a path of a reflected beam from the cube corner block, wherein at least one of the first retardation plate and the second retardation plate is adjustable to set a slow axis to achieve a desired polarization of the reflected beam.

16. The system of claim 15, wherein each of the first and second retardation plates is a quarter-wave plate for the first polarization component.

17. The system of claim 15, wherein:
a linear polarization of the first polarization component is unchanged by reflection from the polarization-manipulating retroreflector; and
the linear polarization of the first polarization component and the slow axis of at least one of the first and second retardation plates are at an angle that differs from 45°.

18. A system for analyzing an input beam, comprising:
a source of a reference beam;
a polarizing beam splitter in a path of the reference beam, wherein the polarizing beam splitter forms a first combined beam containing a portion of the reference beam having a first polarization and a portion of the input beam having a second polarization that is orthogonal to the first polarization;
a non-polarizing beam splitter in a path of the first combined beam;

a first polarization-manipulating retroreflector in a path of a first output beam from the non-polarizing beam splitter;

a second polarization-manipulating retroreflector in a path of a second output beam from the non-polarizing beam splitter, wherein the second output beam after reflecting from the second polarization-manipulating retroreflector is combined with the first output beam after reflecting from the first polarization-manipulating retroreflector to thereby form a second combined beam; and a detector system that measures polarization components of the second combined beam.

19. The system of claim 18, wherein each of the first polarization-manipulating retroreflector and the second polarization-manipulating retroreflector comprises:

a cube corner block that has a reflective coating;

a first retardation plate in a path of an incident beam entering the cube corner block; and a second retardation plate in a path of a reflected beam from the cube corner block, wherein at least one of the first retardation plate and the second retardation plate are adjustable to set a slow axis to achieve a desired polarization of the reflected beam.

20. The system of claim 18, wherein each of the first polarization-manipulating retroreflector and the second polarization-manipulating retroreflector comprises:

a cube corner block;

a first polarization manipulating element in a path of an incident beam entering the cube corner block, the first polarization manipulating element rotating the first and second polarizations to directions for which the cube corner block produces linear polarizations in a reflected beam; and a second polarization manipulating element in a path of the reflected beam from the cube corner block, wherein the second polarization-manipulating element converts the linear polarizations of the reflected beam to a desired form.

21. A system comprising:

a source of a first input beam containing a first polarization component having a first polarization and a second polarization component having a second polarization; a polarizing beam splitter positioned to separate the first polarization component from the second polarization component; and a polarization-transforming retroreflector positioned to reflect the first polarization component and the second polarization component before the first polarization component and the second polarization component are recombined to form an output beam from the polarizing beam splitter, wherein the polarization-transforming retroreflector comprises:

a cube corner block;

a first polarization manipulating element in a path of an incident beam entering the cube corner block, the first polarization manipulating element rotating the first and second polarizations to directions for which the cube corner block produces linear polarizations in a reflected beam; and a second polarization manipulating element in a path of the reflected beam from the cube corner block, wherein the second polarization-manipulating element converts the linear polarizations of the reflected beam to a desired form.

22. The system of claim 21, further comprising:

a second retroreflector;

a first planar reflector;

a second planar reflector; and a quarter-wave plate between the polarizing beam splitter and the first and second planar reflectors, wherein:

the first polarization component from the polarizing beam splitter reflects from the first planar reflector once before reflecting from the second retroreflector and once after reflecting from the second retroreflector; and the second polarization component from the polarizing beam splitter reflects from the second planar reflector once before reflecting from the second retroreflector and once after reflecting from the second retroreflector.

23. A system comprising:

a source of a first input beam containing a first polarization component and a second polarization component;

a polarizing beam splitter positioned to separate the first polarization component from the second polarization component; and a polarization-preserving retroreflector positioned to reflect the first polarization component before the first polarization component and the second polarization component are recombined, wherein the first polarization-preserving retroreflector comprises:

a cube corner block that has a reflective coating;

a first retardation plate in a path of an incident beam entering the cube corner block; and a second retardation plate in a path of a reflected beam from the cube corner block, wherein a linear polarization of the first polarization component and a slow axis of at least one of the first and second retardation plates are at an angle that differs from 45°.

24. The system of claim 23, wherein each of the first and second retardation plates is a quarter-wave plate for the first polarization component.

* * * * *